United States Patent Office 3,345,154
Patented Oct. 3, 1967

3,345,154
METHOD OF PREPARING A FOLIAGE TREATMENT MATERIAL FROM ZINC OXIDE, PHOSPHORIC ACID AND CALCIUM HYDROXIDE
John R. Allison, Whittier, and Manuel J. Cereghino, Seal Beach, Calif., assignors to Leffingwell Chemical Company, Whittier, Calif., a corporation of California
No Drawing. Filed June 1, 1964, Ser. No. 371,761
4 Claims. (Cl. 71—42)

This invention relates to improved methods and compositions in the field of inorganic plant nutrients, particularly zinc, phosphorus and calcium containing-complexes, which have proven highly effective in correcting plant deficiencies as to these, as well as additional elements if desired, by application to the plant foliage. More specifically, the invention involves the making and use of such complexes in finely divided form, either powdered or spray dried, applicable to the foliage in aqueous or water-oil emulsion dispersions, to be assimilated by processes occurring by subjection of the very limitedly soluble complex particles to slight surface acidity of the foliage.

Our general object is to provide for incorporation in a micro-nutrient salt complex, of at least zinc, phosphorous and calcium in a manner more amenable to assimilation of these elements by plant foliages in general, and particularly vegetables, citrus and deciduous fruit tree foliage, as well as to achieve greater directness, efficiency and economy in production of a product complex from which these elements are available.

In terms of the present product and its method of preparation, the invention is predicated upon the reaction of zinc oxide with phosphoric acid to produce an intermediate reaction mixture of zinc orthophosphate and excess phosphoric acid, and second stage reaction of the resulting mixture with calcium hydroxide to produce a salt complex of zinc phosphate and calcium phosphate, characterized by the non-caking tendencies of the solids and their amenability to easy drying either as powder or in small spray dried bead form. By reason of the starting zinc oxide-phosphoric acid reaction, it becomes possible to achieve superior nutrient potential in the product, more directly and advantageously from production standpoints, than by prior procedures, as for example described in my Patent No. 2,823,107 of Feb. 11, 1958, wherein the complexing of zinc, phosphorous and calcium-containing salts involves initially reacting zinc sulfate with phosphoric acid, with attendant formation of calcium sulfate, instead of the more effective calcium orthophosphate herein contemplated.

In accordance with the invention, zinc oxide is reacted with a stoichiometric excess (1 to 50 mol percent) of phosphoric acid to produce a mixture of zinc orthophosphate ($Zn(H_2PO_4)_2$) and phosphoric acid, the reaction temperature being kept below 180° F. to assure the ortho form of the zinc salt.

To the resulting mixture is added essentially aqueous calcium hydroxide, by which term is included water solution of quicklime, being $Ca(OH)_2$, or of dolomite, being $CA(OH)_2$ with $Mg(OH)_2$, and the pH of the reaction mixture is kept between 6 and 8 (which also has the pH range of the dried complex). The consequent reaction product is very limitedly soluble, well dispersed slurry complex of zinc phosphate ($Zn_2(PO_4)_2$) crystal with calcium orthophosphate, apparently as either or both $CaHPO_4$ and $Ca_3(PO_4)_2$ (or $CaMgPO_4$ when dolomite is used), together with calcium zinc phosphate $$(CaZn_2(PO_4)_2)$$

The exact crystalline make-up of the complex is indeterminate at present, as are all reasons for the potential effective availability of the complexed elements by reason of their chemical and crystalline structures as so complexed.

To the essentially constituted slurry produced may be added compounds of selectable minor elements as may be desired in different products to serve particular purposes. Thus, additional zinc, as well as manganese, copper, and iron may be incorporated in the zinc-phosphate-calcium complex by introducing to its slurry and in powdered or precipitated form, any of zinc carbonate or zinc oxide, manganese carbonate or manganese oxide, copper carbonate or copper oxide, or iron carbonate, and basic sulfates and carbonates of these metals. When used, any of these ordinarily will be added in small proportions, say up to 60% by weight of the dried product.

The reaction proportions of zinc oxide, phosphoric acid, and essentially calcium hydroxide, may be varied within ranges to provide in the dried product between about 5.5% to 30% (by weight) of zinc, 10% to 40% calcium, and 5.5% to 50% phosphorous calculated as $P_2O_5$.

The final product slurry may be dried by any of the conventional methods or apparatus, as by drying or spray drying. As dried, and for subsequent slurrying in water or in oil emulsion, the material will have a fineness predominantly within the 100 to 400 inch mesh range.

The followig examples show typical reactants and their proportions, as well as determinations of the resulting complexes.

EXAMPLE I 200 pounds of zinc oxide are reacted with 900 pounds of 75% phosphoric acid, at a reaction temperature kept below 180° F. To the resulting mixture is added 315 pounds of calcium hydroxide in aqueous solution. The resulting complex is then heated to dryness.

Dried product analysis:                                Percent
    Zinc (as metallic) _____ 15
    Phosphoric as $P_2O_5$ _____ 42
    Calcium _____ 18

X-ray diffraction:
    Calcium acid phosphate _____ $CaHPO_4$
    Calcium phosphate _____ $Ca_3(PO_4)_2$
    Zinc phosphate _____ $Zn_3(PO_4)_2 \cdot 4H_2O$
    Calcium zinc phosphate _____ $CaZn_2(PO_4)_2 \cdot 2H_2O$

EXAMPLE II 400 pounds of zinc oxide is reacted with 1800 pounds of 75% phosphoric acid. 600 pounds of aqueous quicklime is then reacted with the resulting mixture. To the reaction complex so formed is added 1300 pounds of zinc carbonate.

Product analysis:                                       Percent
    Zinc (as metallic) _____ 25
    Phosphoric acid as $P_2O_5$ _____ 28
    Calcium _____ 10

X-ray diffraction:
    Calcium acid phosphate _____ $Ca(HPO_4) \cdot 2H_2O$
    Zinc phosphate _____ $Zn_3(PO_4)_2 \cdot 4H_2O$
    Zinc carbonate _____ $ZnCO_3$
    Calcium phosphate _____ $Ca_3(PO_4)_2$

EXAMPLE III 330 pounds of zinc oxide are reacted with 1483 pounds of 75% phosphoric acid, and to the resulting mixture is added 520 pounds of aqueous quicklime. Then to the salt complex slurry so formed is added 1080 pounds of zinc carbonate and 1500 pounds of manganese carbonate.

Product analysis:                                   Percent
    Zinc (as metallic) _____ 15
    $P_2O_5$ _____ 15
    Manganese (as metallic) _____ 15

X-ray diffraction:
    Calcium acid phosphate _____ $CaHPO_4$
    Calcium phosphate _____ $Ca_3(PO_4)_2$
    Zinc phosphate _____ $Zn_3(PO_4)_2 \cdot 4H_2O$
    Zinc carbonate _____ $ZnCO_3$
    Manganese carbonate _____ $MnCO_3$ Ordinarily the finely divided nutrient complex, either in spray dried or powder form, will be applied to the plant foliage using conventional spray equipment. For spray application in water, dispersions of about 5 to 25 pounds of the nutrient in 100 gallons of water will suffice for individual applications that may be repeated from time to time depending upon the results observed. Similarly, for application in oil emulsions, from about 1 to 5 pounds of the nutrient may be dispersed in 100 gallons of water emulsified with around two gallons of conventional spray oil.

We claim:

1. The method of preparing an inorganic micronutrient plant foliage treatment material of limited water solubility, that includes reacting zinc oxide with phosphoric acid at a temperature not in excess of 180° F. to produce zinc dihydrogen orthophosphate with excess phosphoric acid, adding aqueous calcium hydroxide to the resulting mixture to produce an aqueous complex of zinc phosphate and calcium orthophosphate, and drying said complex to produce same in particulate crystalline complex form, the dried complex having limited water solubility and having a pH within the range of 6 to 8 and containing between about 5.5% and 30% zinc, 10% and 40% calcium, and 5.5% and 50% phosphorous calculated as $P_2O_5$.

2. The method of claim 1, in which said aqueous calcium hydroxide is derived from the group consisting of aqueous quicklime, and aqueous dolomite.

3. The method of claim 1, in which to said aqueous complex is added further plant nutrient selected from the group consisting of zinc carbonate, zinc oxide, manganese carbonate, manganese oxide, copper carbonate, copper oxide, iron carbonate, and basic sulfates and carbonates of these metals.

4. The product made by the method of claim 1.

References Cited

UNITED STATES PATENTS 2,823,107   2/1958   Allison _____ 71—1 X
3,244,500   4/1966   Stinson et al. _____ 71—1

DONALL H. SYLVESTER, *Primary Examiner.*

R. BAJEFSKY, *Assistant Examiner.*